United States Patent [19]
Malloy

[11] Patent Number: 5,161,922
[45] Date of Patent: Nov. 10, 1992

[54] ELECTRONIC MICRO-STOP/TOOL FAILURE MONITOR

[75] Inventor: Joseph P. Malloy, Portland, Oreg.

[73] Assignee: The Boeing Company, Seattle, Wash.

[21] Appl. No.: 625,518

[22] Filed: Dec. 11, 1990

[51] Int. Cl.$^5$ .............................................. B23B 49/00
[52] U.S. Cl. ................................. 408/14; 324/207.16; 324/226; 408/16
[58] Field of Search ................... 408/5, 6, 10, 11, 12, 408/14, 16, 13; 324/207.16, 207.22, 207.26, 226, 234, 236, 239, 261, 262, 263

[56] References Cited

U.S. PATENT DOCUMENTS

| | | | |
|---|---|---|---|
| 2,985,823 | 5/1961 | Wright, Jr. | 324/207.16 |
| 3,747,085 | 7/1973 | Bala et al. | 408/6 |
| 4,338,823 | 7/1982 | Iwasaki | 324/207.16 |
| 4,385,297 | 5/1983 | Schmitt et al. | 324/207.16 |
| 4,535,624 | 8/1985 | Ginns et al. | 324/207.26 |
| 4,703,262 | 10/1987 | Fujioka et al. | 324/207.22 |

FOREIGN PATENT DOCUMENTS

| | | | |
|---|---|---|---|
| 2517235 | 6/1983 | France | 408/13 |
| 2067765 | 7/1981 | United Kingdom | 324/207.22 |

Primary Examiner—Daniel W. Howell
Attorney, Agent, or Firm—Conrad O. Gardner; B. A. Donahue

[57] ABSTRACT

Electronic measuring and control of countersinking depth and/or failure of a drilling tool. Eddy current proximity detecting means is utilized for stopping and retracting the countersink drilling process after a pre-selected depth is achieved wherein a visual indication of the countersink depth is provided by way of sequentially lit LED segments through structure for detecting a surface up and away from the working end of the tool thereby avoiding contamination problems. Further, detection of vibration or chatter in the workpiece is shown as a means for detecting tool defects.

3 Claims, 5 Drawing Sheets

ELECTRONIC MICRO-STOP/TOOL FAILURE MONITOR

FIELD OF THE INVENTION

The present invention relates to a device to control countersink depth, spot surface depth and other depth measures.

In accordance with a preferred embodiment, a standard thread adjusted micro-stop is modified with a precision turned disk fitted perpendicular to the rotating shaft of the micro-stop. As countersinking is in process the advancing position of the disk is sensed by an eddy current device which is fastened to the non-rotating base of the micro-stop. The output of the eddy current device goes to a set point controller and relay circuit; and at a predetermined countersink depth the set point controller triggers and causes the drill feed to stop and retract. Another embodiment of the disclosure provides for a visual indication of the depth of the countersink. LED segments light up as the tool reaches the desired depth and provides the operator with visual feedback. One other embodiment is a tool failure monitor mode and involves detecting vibration or chatter in the workpiece as a means for detection of any tool defect.

BACKGROUND OF THE INVENTION

The prior art patent literature shows several methods of controlling and limiting countersink depths of drilling machines. U.S. Pat. Nos. 2,574,653 (Miller) and 3,555,964 (Fleming) in particular employ threaded hard stops which are manually adjusted to limit the stroke of the drill feed systems. U.S. Pat. No. 4,717,291 (Zafir) utilizes a threaded hard stop positioned by a motor driven spur gear and ring gear arrangement, and is automatically adjusted for each previously measured fastener. U.S. Pat. No. 4,272,215 (Davert et al) describes a remote controlled wedge system which is driven back and forth to vary the height of the countersink stop. As described above, countersink hard stops adjusted by threaded arrangements or motor driven wedges are well known in the art. However, none of the prior art is illustrating use of non-contact eddy current systems, similar to the present system, to limit or monitor the countersink depth systems. U.S. Pat. No. 3,694,637 (Edwin et al) describes an apparatus to monitor tool wear as a function of change in power frequency characteristics of the tool during use. The system utilizes a small general purpose computer and detector circuit for analysis and tool monitoring respectively. U.S. Pat. No. 3,841,149 (Edwin et al) describes a tool wear detector system which compares a reference value representing the broadband vibrational energy output of an unworn tool to a running broadband average of the tool being used.

The present system in contrast shows the utilization of rapidly deviating voltage swings as detected by the eddy current displacement transducer to indicate tool condition and wear.

DETAILED DESCRIPTION OF THE INVENTION

The present system resolves a number of problems associated with depth control in hole preparation operations.

Figure 1:
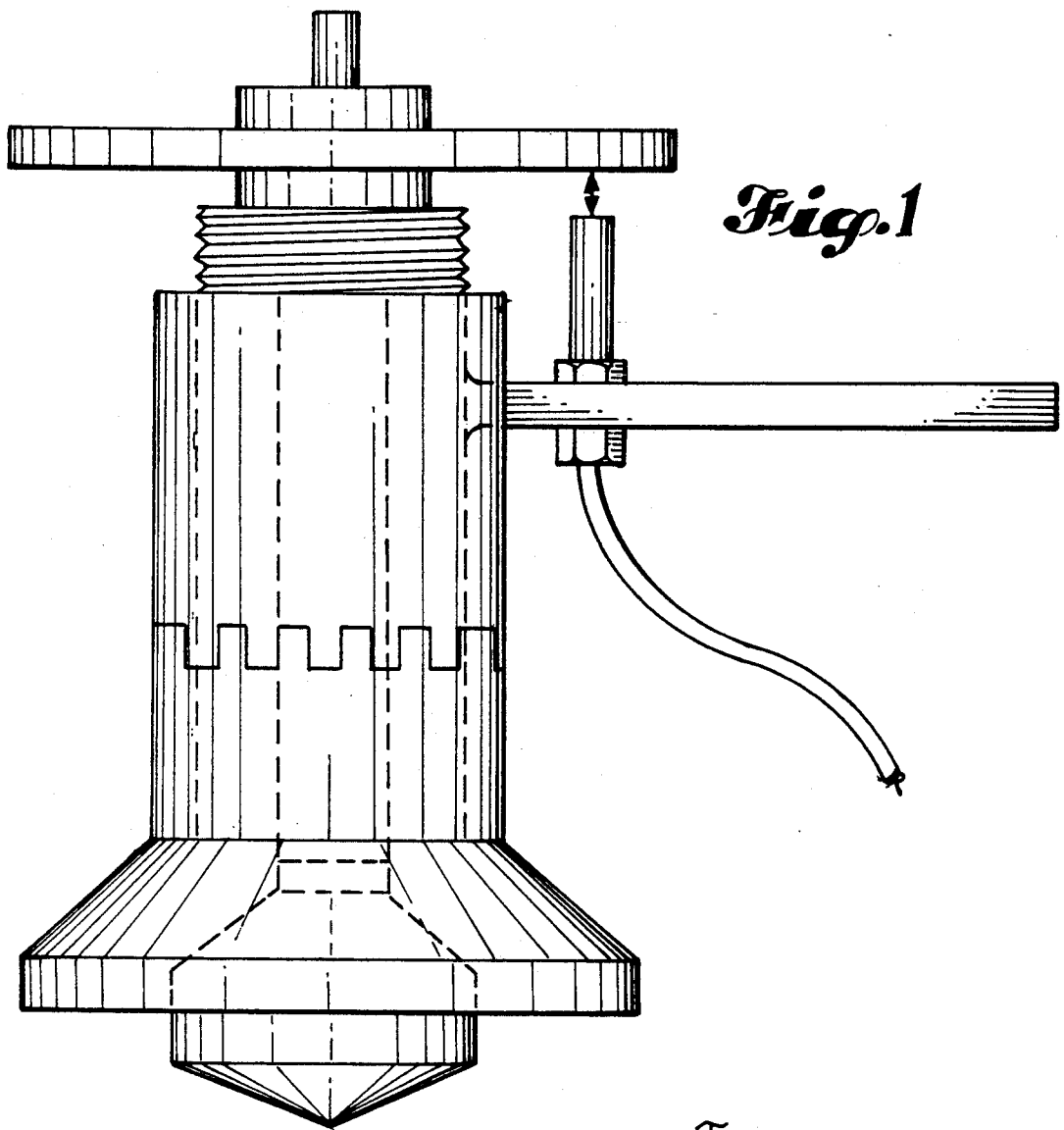
FIG. 1 is a block diagram illustrative of the present electronic micro-stop system.

The initial concept for the present electronic micro-stop was tested with an eddy current proximeter affixed to a retro-fitted micro-stop (See FIG. 1).

This concept has been tested in both automatic and manual modes. In the automatic mode, test holes were counter sunk with a 3-flute, carbide, tin coated tool. These holes, fabricated on an alzmetal drill press were found to repeat within 0.0015 inch of one another on 4340 heat treated steel.

In the manual mode the operator, using the same tool, was able to repeat from one countersunk hole to the next—on both aluminum and 4340 heat treated steel—to within 0.0005 inch. The displacement target for the proximeter is a disk attached to the rotating shaft of a micro-stop. The eddy current sensor shown should be considered exemplary and other sensors may be used for the measurement of displacement.

The present electronic micro-stop features the method of applying a displacement gauge for depth control.

One inherent limitation of existing uses of the eddy current sensor in gauging depth is the requirement that chips be kept from getting between the sensor face and the workpiece.

As can be seen in FIG. 1, the present electronic micro-stop detects a surface up and away from the working end of the tool, and is therefore not contaminated by foreign material.

If coolant is splashed on its surface the proximeter effectively sees through it.

Perhaps most important, the present electronic micro-stop configuration operated independently of the material composition of the workpiece. By looking at the same target, i.e. the rotating disk, it is impervious to the question of workpiece material.

Another disadvantage to be found in existing applications of eddy current displacement sensors for depth control on drill presses, is the requirement for a specialized mounting fixture for each unique machine.

The present electronic micro-stop in contrast, can be inserted into the chuck of any drill press.

The present system allows for an easy retro-fit of presently available micro-stops.

Figure 2:
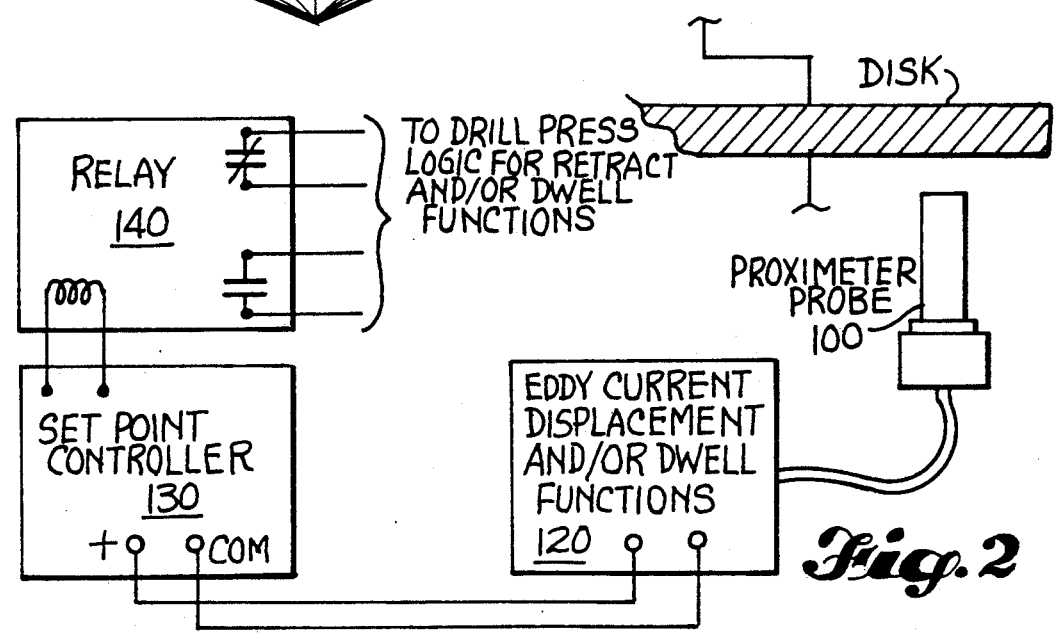
FIG. 2 is a block diagram illustrative of the present electronic micro-stop system in automatic feed configuration.

The schematic of FIG. 2 shows one configuration for the present electronic micro-stop. As the probe 100 approaches the rotating disk 110 while the drill press is feeding the tool into the part, the eddy current electronics 120 outputs a 0-10 volt DC signal to set-point controller 130. As configured for the test on the alzmetal drill press, set-point controller 130 is set to trigger at a voltage level that occurs when probe 100 is within 0.001 inches of rotating disk 110. Set-point controller 130 in turn triggers relay 140 which signals machine control, executes a dwell and retracts.

A further configuration may utilize a variable speed controller (inverter) on a radial drill press. When the probe reaches the set-point condition the inverter would be commanded to decel, reverse spindle speed, and therefore reverse the direction of the feed as well.

Figure 3:
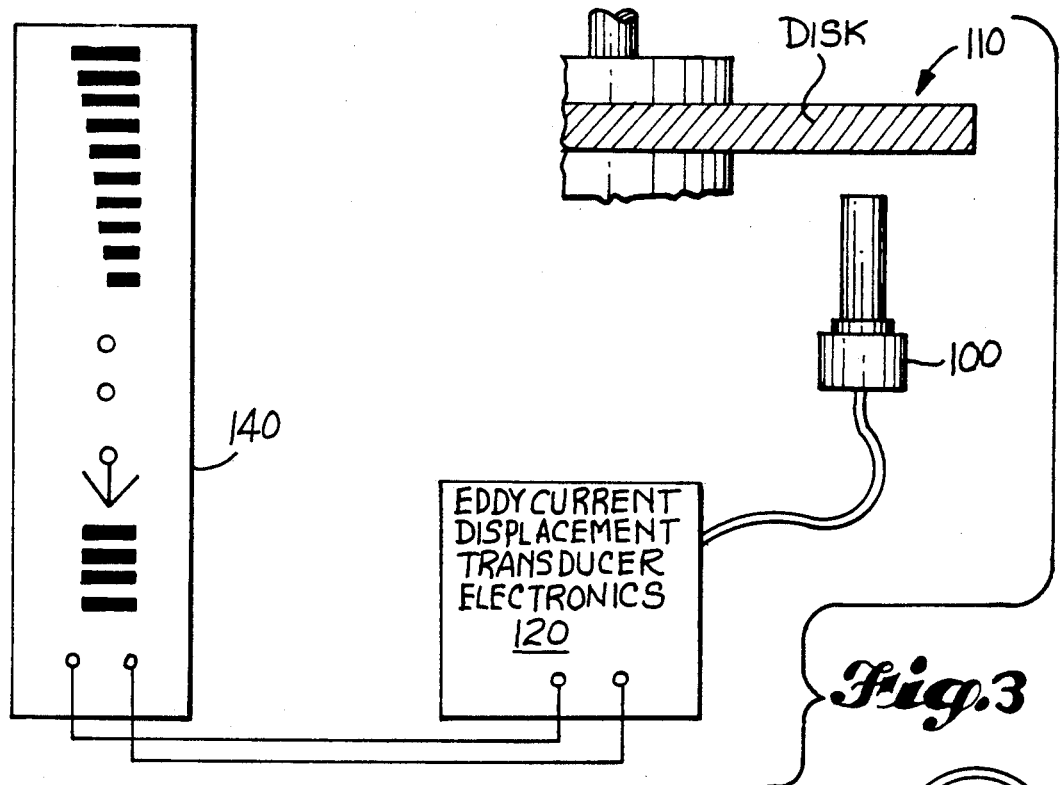
FIG. 3 is illustrative of the present electronic micro-stop system including a visual indication of the depth of the tool through utilization of a bar graph feedback to the operator.

Yet another configuration provides for a visual indication of the depth of the tool by providing a bar graph feedback to the operator, seen in FIG. 3. As probe 100 approaches target disk 110, i.e. the tool approaches the required depth, eddy current electronics 120 will output a corresponding change in voltage between 0 volts DC and 10 volts DC. This voltage is in turn utilized to drive led bar graph display 140.

When the tool reaches the required depth the operator can intervene manually to halt the feed process—whether or not the feed occurred manually or automatically.

This manual technique has been used with a digital volt meter in place of the bar graph to allow an operator to countersink holes repeatably within 0.0005 inch of one another.

Note that if the electronics fail the micro-stop will provide for a mechanical fail-safe and the tool will "bottom out."

The tool failure monitor could detect any tool defect that causes vibration or chatter in the work piece.

Figure 4:
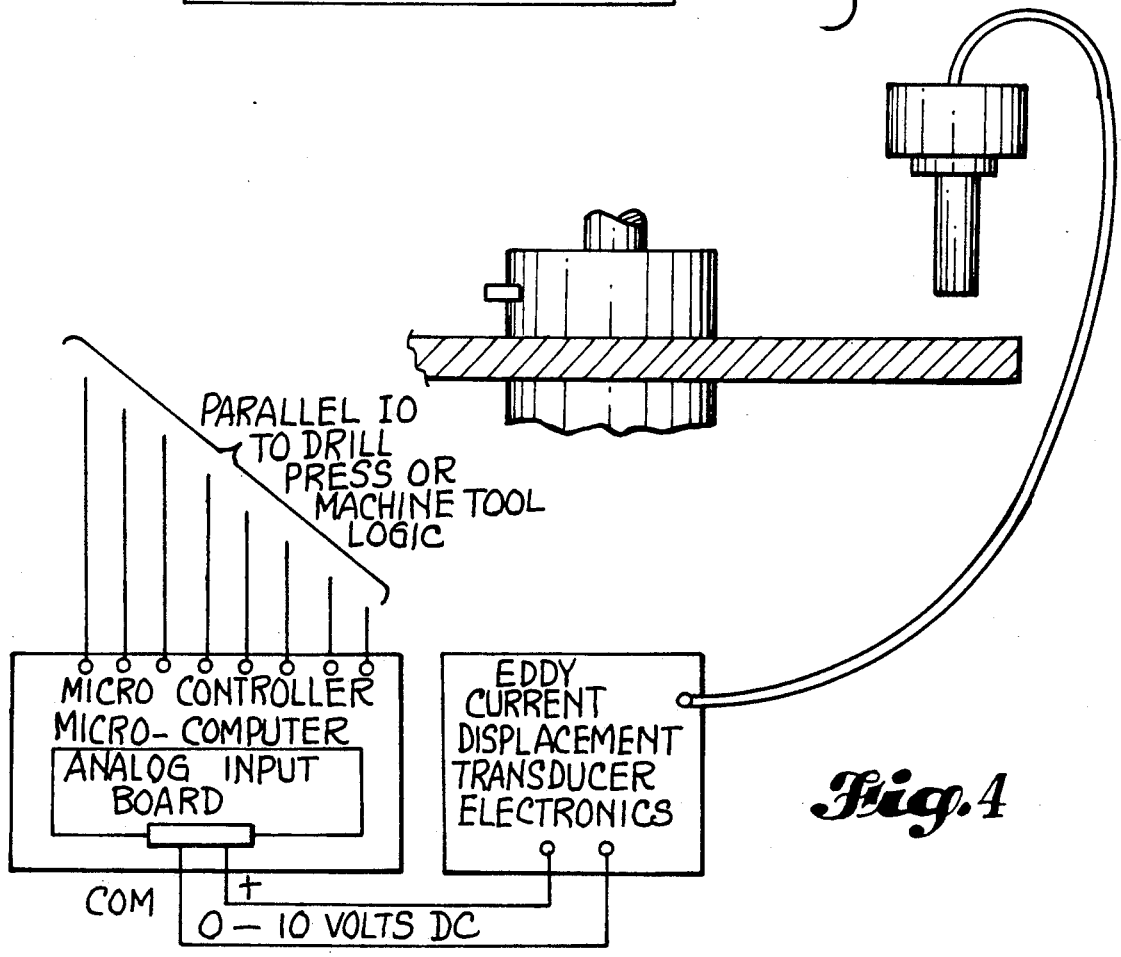
FIG. 4 is a block diagram which is further illustrative of how the present electronic micro-stop system may be utilized or as a stand alone tool failure monitor.

The device, as shown in FIG. 4 may be used in conjunction with the present electronic micro-stop or as a stand alone tool failure monitor.

An eddy-current probe is mounted to a non-rotating member of a machine spindle head or spindle quill. A disk is then mounted to a rotating member of the spindle.

The disk is constructed in such a manner that material and geometry allow for an amplification of any vibration occurring at the point w here the cutting tool contacts the workpiece.

The spinning disk acts as a diaphragm in amplifying vibratory signals.

Vibration apart from the inherent wobble of the disk would provide for an indication of tool failure. A time based algorithm may be utilized to detect for short term chatter or vibration over a given time frame.

Rapidly deviating voltage swings are monitored by a micro-controller via an analog input from the eddy current transducer. When an unacceptable amount of vibration is detected by the micro-controller, it outputs a signal via a parallel or serial link to the machine control.

Figure 5:
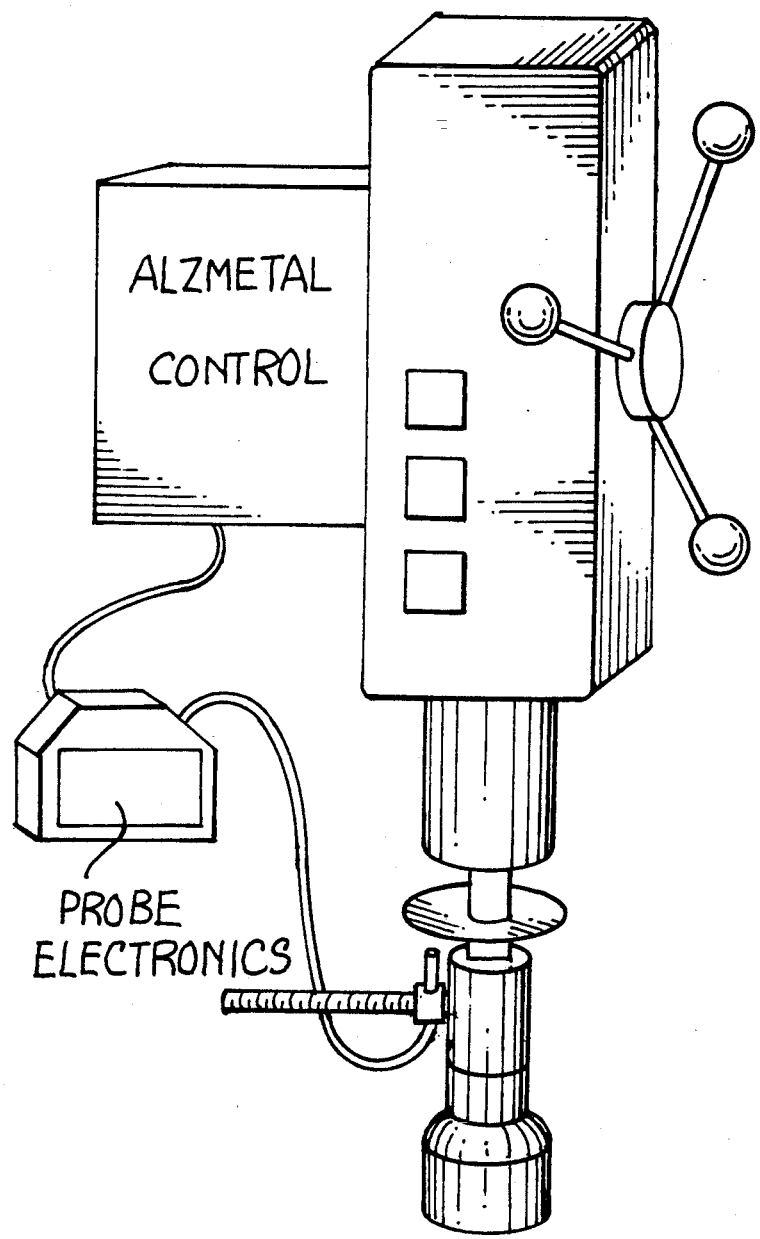
FIG. 5 is a functional schematic overview of the present automated system configuration.

Turning now to FIG. 5, a functional schematic overview of the hereinbefore describe automatic micro-stop system configuration is shown in which automated countersink operation allows 0.0015 inch repeatability from hole to hole.

Figure 6:
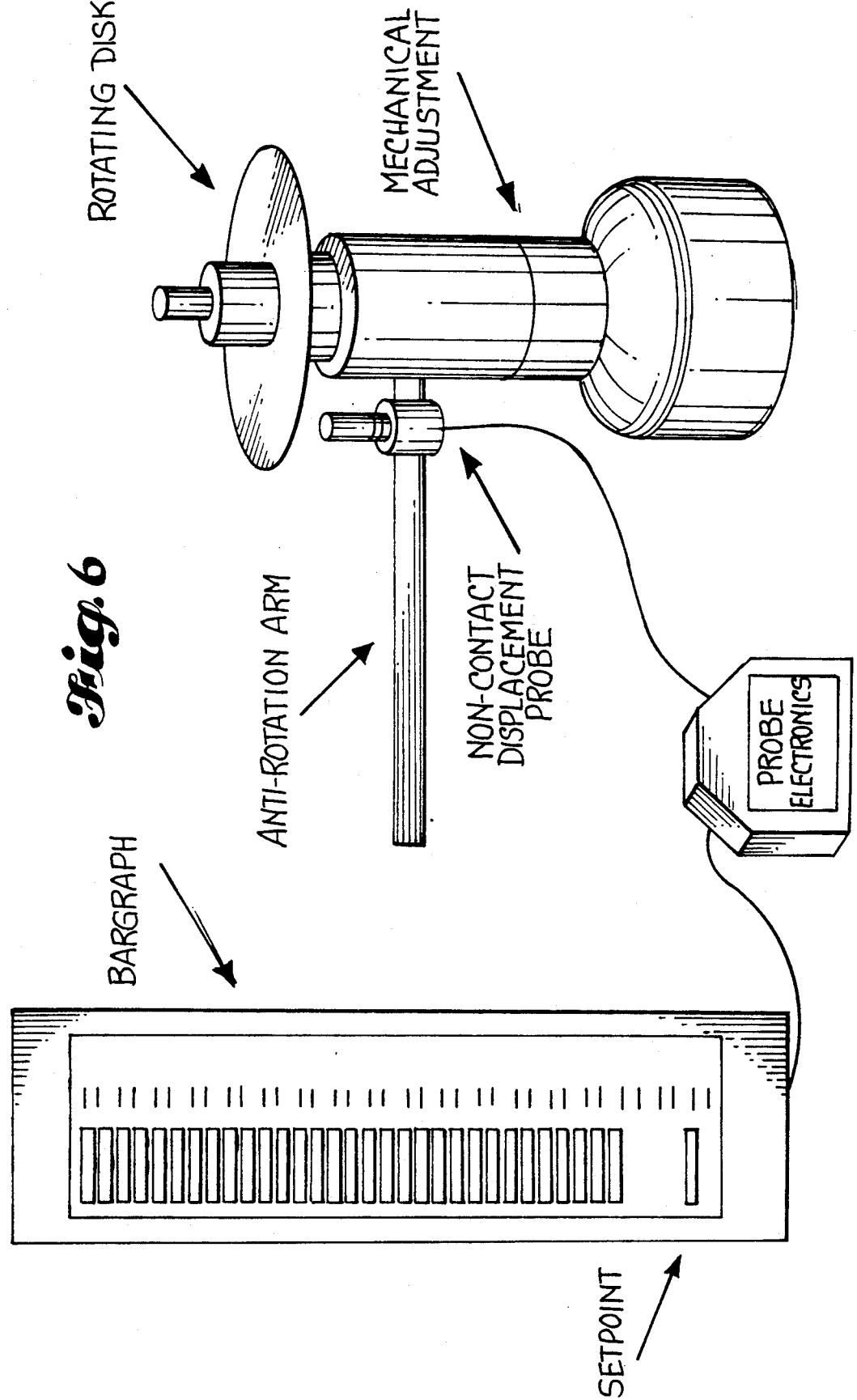
FIG. 6 is a functional schematic manual system configuration.

FIG. 6 is deemed helpful in providing a functional schematic overview of the present manual system configuration showing further the use of bar graph output display for the operator.

Figure 7:
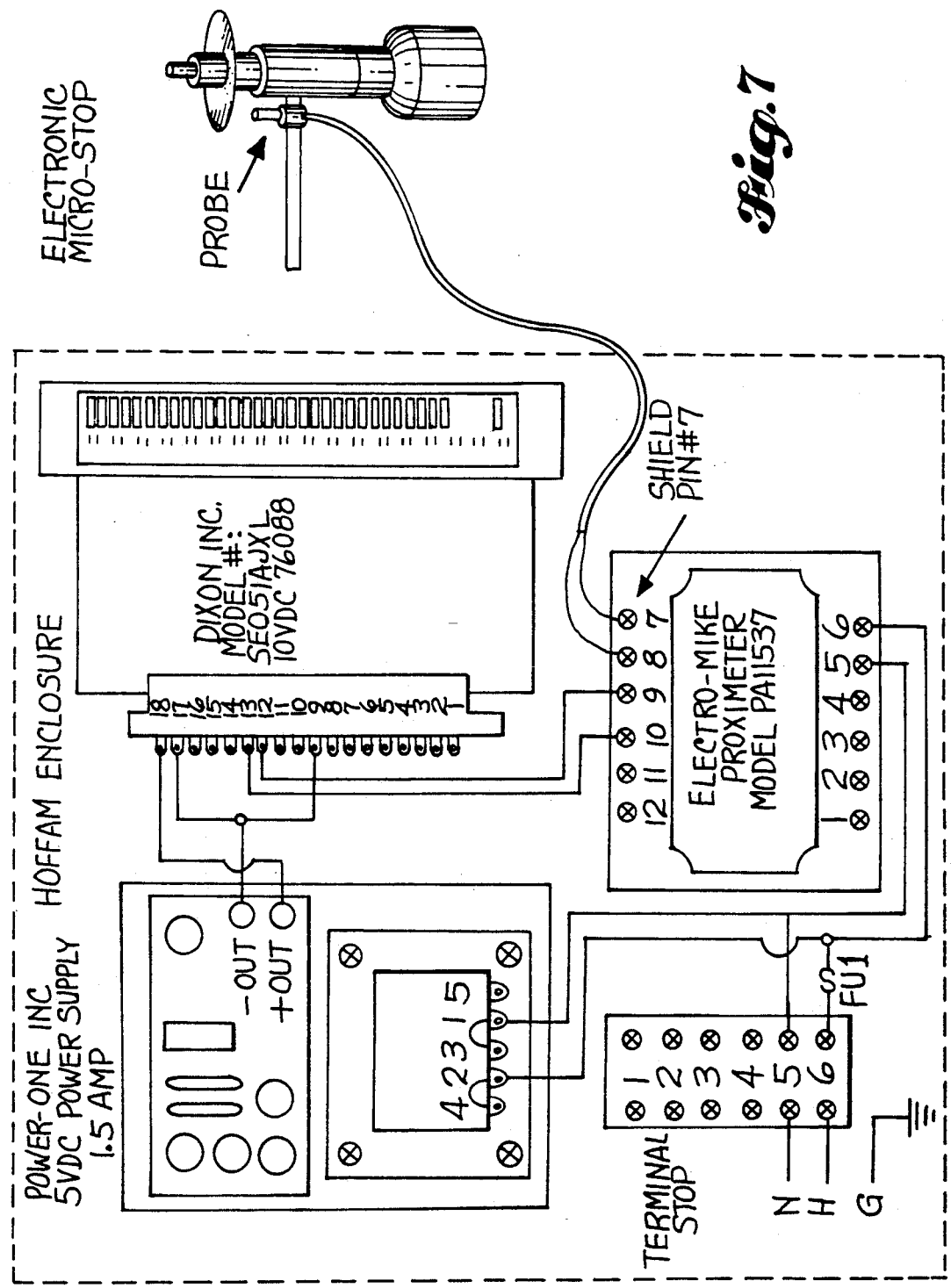
FIG. 7 is a schematic showing manual configuration of the present electronic micro-stop system with specific illustrative hardware subsystem components identified.

FIG. 7 is included to show exemplary hardware subsystem components for use in the hereinbefore described manual configuration of the present electronic micro-stop system

What is claimed is:

1. A system for controlling countersink depth comprising in combination:
   a threaded adjusted micro-stop having a rotating shaft and a non-rotating base;
   a disk disposed perpendicular to said rotating shaft;
   an eddy current device positioned on said non-rotating base of said micro-stop for sensing the advancing position of said disk during countersinking;
   a set point controller and relay circuit responsive to the output of said eddy current device;
   said set point controller triggering at a predetermined countersink depth for causing a drill feed to stop and retract.

2. The system of claim 1 further including a visual indicator device responsive to the countersink depth.

3. The system of claim 2 wherein said indicator device includes a plurality of LED segments which are illuminated when said predetermined depth is reached providing visual feedback to an operator.

* * * * *